United States Patent
Podila et al.

(10) Patent No.: US 6,952,722 B1
(45) Date of Patent: Oct. 4, 2005

(54) METHOD AND SYSTEM USING PEER MAPPING SYSTEM CALL TO MAP CHANGES IN SHARED MEMORY TO ALL USERS OF THE SHARED MEMORY

(75) Inventors: Srinivis Podila, Bangalore (IN); Haresh Kheskani, Saratoga, CA (US); Pradeep Kumar Kathail, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 487 days.

(21) Appl. No.: 10/053,760

(22) Filed: Jan. 22, 2002

(51) Int. Cl.[7] ............................................. G06F 12/00
(52) U.S. Cl. ...................... 709/213; 709/215; 719/312; 711/147; 711/153; 711/170; 711/202
(58) Field of Search ................................. 709/213, 215, 709/102; 719/312, 330, 331; 711/147, 151, 153, 169, 170, 202; 718/102

(56) References Cited

U.S. PATENT DOCUMENTS

| | | | | |
|---|---|---|---|---|
| 5,787,300 A | * | 7/1998 | Wijaya | 712/1 |
| 6,601,146 B2 | * | 7/2003 | Auslander et al. | 711/147 |
| 6,629,153 B1 | * | 9/2003 | Gupta et al. | 719/316 |
| 2001/0047512 A1 | * | 11/2001 | Szewerenko et al. | 717/10 |
| 2002/0129085 A1 | * | 9/2002 | Kubala et al. | 709/104 |
| 2002/0129172 A1 | * | 9/2002 | Baskey et al. | 709/310 |
| 2003/0093487 A1 | * | 5/2003 | Czajkowski et al. | 709/213 |

FOREIGN PATENT DOCUMENTS

| WO | WO 200013085 A1 | * | 3/2000 | G06F/9/46 |
|---|---|---|---|---|

\* cited by examiner

*Primary Examiner*—Hong Kim
(74) *Attorney, Agent, or Firm*—Charles E. Krueger

(57) ABSTRACT

A method and system utilizing a peer mapping system call, called by a first process, to map allocated shared memory into the address space of a second process. Code for implementing the system call can reside in a server which provides services to map allocated shared memory into all the processes having access to shared memory or the code can be located in a library linked to all the processes having access to shared memory.

10 Claims, 4 Drawing Sheets

METHOD AND SYSTEM USING PEER MAPPING SYSTEM CALL TO MAP CHANGES IN SHARED MEMORY TO ALL USERS OF THE SHARED MEMORY

BACKGROUND OF THE INVENTION

To provide desired high availability and serviceability features, embedded systems are increasingly using micro kernels. In this environment, every process has its own memory space and can access its own address space only. Any attempt to access outside its own address space will kill the process.

In this micro kernel environment, communication between two processes is achieved by Inter Process Communication (IPC). Typically a micro kernel provides more then one method for IPC and selection of a particular method depends on the degree of fault isolation required, the amount and frequency of data that needs to be communicated, and the overall performance required. For processes that are very performance sensitive and have large amount of data to share, IPC using shared memory is often preferred.

Multiple related processes running on the system can interact with each other. For sharing data between these different processes, the operating system (OS) provides several facilities. A typical POSIX (a portable operating system based on UNIX) operating system provides following IPC facilities:

Shared memory

Message queue

Semaphores

Named Pipes etc.

Shared Memory is the most efficient method for sharing and/or exchanging large amount of data. Large data structures can be shared using shared memory.

For a process to access shared memory, the shared memory must be mapped into the processes address space. This is typically done by a memory management call (mmap) provided by the kernel. An "mmap" system call maps the specified memory in the address space of calling process.

Multiple processes accessing the shared memory can be treated as peers, where every process has equal rights to read, write, extend and shrink the shared memory.

Alternatively, multiple processes accessing the shared memory can also work in the client server/mode, where one process (server) typically has more rights than the client. Typically in this mode, the server process has rights to read, write, extend, and shrink the memory, while client processes can only read and write the memory.

However, using shared memory becomes very complicated if shared data is not flat, i.e., includes pointers linking data structures, or is not contiguous. Typically processes will use pools of memory. When one pool runs out a process will allocate the next shared memory pool and link the pools together. Problems also arise from the fact that pointers to some part of this shared memory may be stored into other data structures that are stored in this memory (linked lists, etc.). If the shared memory is not mapped immediately into all the processes that are using it, then processes that do not have the additional memory mapped will crash.

For these types of shared data patterns, all processes accessing the shared memory must map the shared memory into their address space before the data structure can be modified and used. In cases where non-contiguous memory is allocated, this memory must be mapped into address spaces of all the processes that are using it before memory becomes useful.

This means that every process must implement a protocol to map and access this shared memory. These protocols make the entire system complicated and inefficient.

Further, these protocols typically require the application that is changing the size of shared memory to send a notification to all the users of memory and to wait for confirmation from them. While this is going on, memory may be locked down and unusable by other processes.

BRIEF SUMMARY OF THE INVENTION

In one embodiment of the invention, a unique peer mapping system call allows a process to allocate and map additional shared memory in its own address space and also to allocate and map the added shared memory to the address space of all other processes having access to the shared memory.

In another embodiment of the invention, the mapping to other process's address space by the peer mapping system call is transparent to those processes.

In another embodiment of the invention, system call code allocates shared memory and maps allocated shared memory into specified processes address space.

In another embodiment of the invention, when a process starts or restarts, the process can connect to the peer mapping system call code which maps all the required shared memory into the process's address space and returns it a pointer to the beginning of a data structure.

In another embodiment of the invention, the system call code utilizes library code linked to all processes having access to the shared memory.

In another embodiment of the invention, the system call code is included in a server that registers all processes associated with a shared memory. The process requiring additional memory, requests the server to allocate requested shared memory and map the newly allocated shared memory into the address space of all processes.

Other features and advantages of the invention will be apparent in view of the following detailed description and appended drawings.

DETAILED DESCRIPTION OF THE EXEMPLARY EMBODIMENTS

The embodiments below are described assuming that multiple related processes are running in the client server mode. The shared memory management code can be implemented as a library. Linking all the related application with this library will allow applications to run in the peer mode.

The invention will now be described with reference to various embodiments. A first embodiment will be described, by way of example, not limitation, in a POSIX environment where processes use system calls to request services from the POSIX operating system (OS). In the following, the process that requests the OS to designate an area of memory as shared memory is called the server. All other processes that use the allocated shared memory are clients. Thus, the designation of a process as client or server depends on the relationship of the process to the allocation and use of the shared memory.

In a typical case, where data is exchanged between server and client processes, the server process will be adding data to a shared data structure, such as a shared table. The client processes then map these data structures into their address spaces to read and/or modify the data. The server and client processes need to have a protocol to exchange information about the data structure size. Whenever the size of the data structure increases, the server needs to send messages to all clients informing them of the new size. These messages are sent utilizing messaging protocols, such as message queues, well known in the art.

Figure 1:
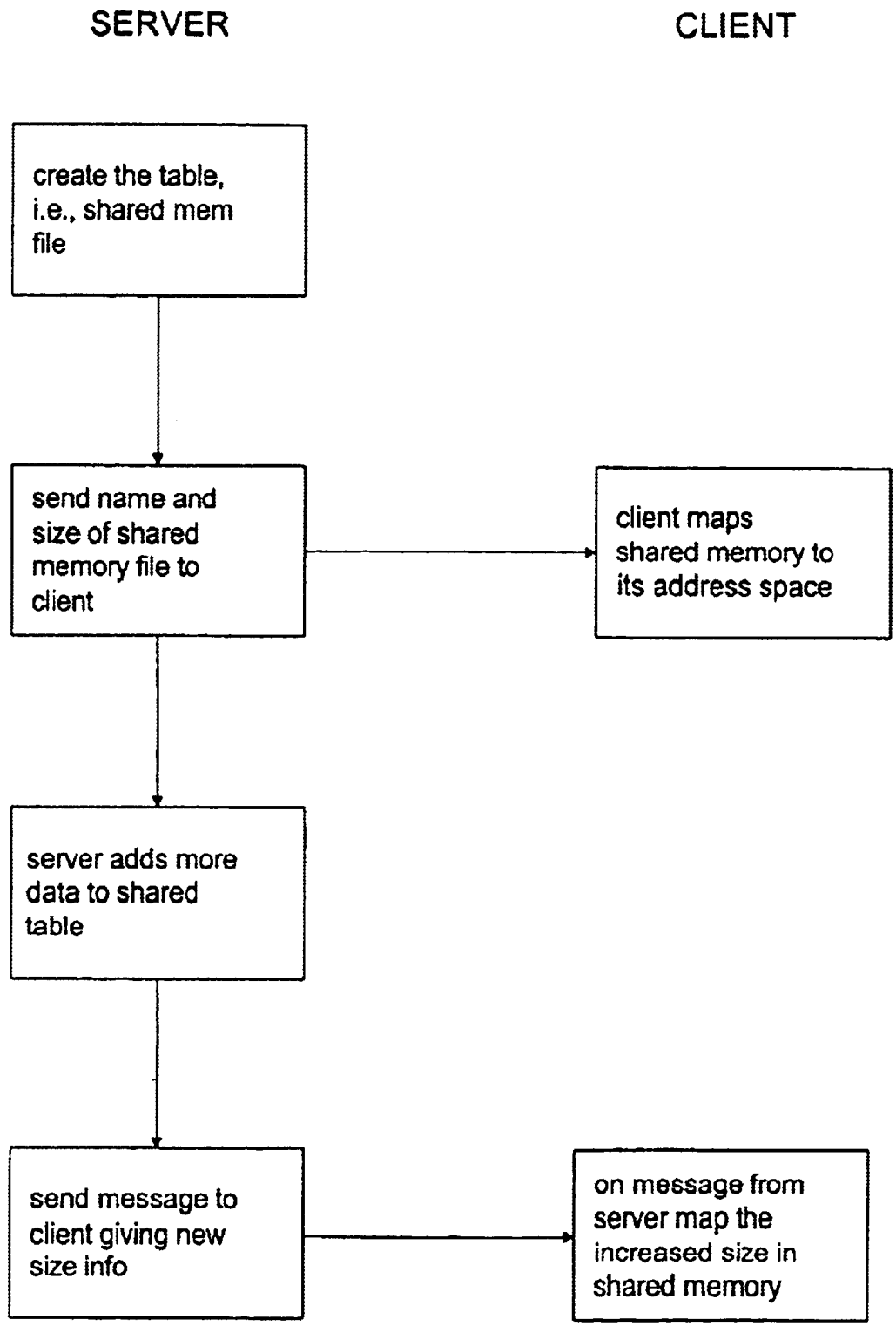
FIG. 1 is a flow chart depicting the standard method for adding shared memory to client processes.

Subsequent to receiving these messages, all the client processes need to map the addition to the data structure into their address space as described above. As shown in the chart of FIG. 1, the server needs to send messages to all the clients whenever there is a change in the size of data structure that is being shared. This is quite cumbersome, especially if the data structure size can often increase or decrease. To do this, in most operating environments, processes will create their own private protocol. Typically this protocol will be:
a) Map shared memory into local space.
b) Find all processes using this shared memory
c) Send the processes using the shared memory a notification to map the shared memory into their address space.
d) Wait for response from all processes. If some process is not responding do the proper error recovery.
e) Start using memory.

Steps c) and d) are eliminated this embodiment of the invention.

Figure 1A:
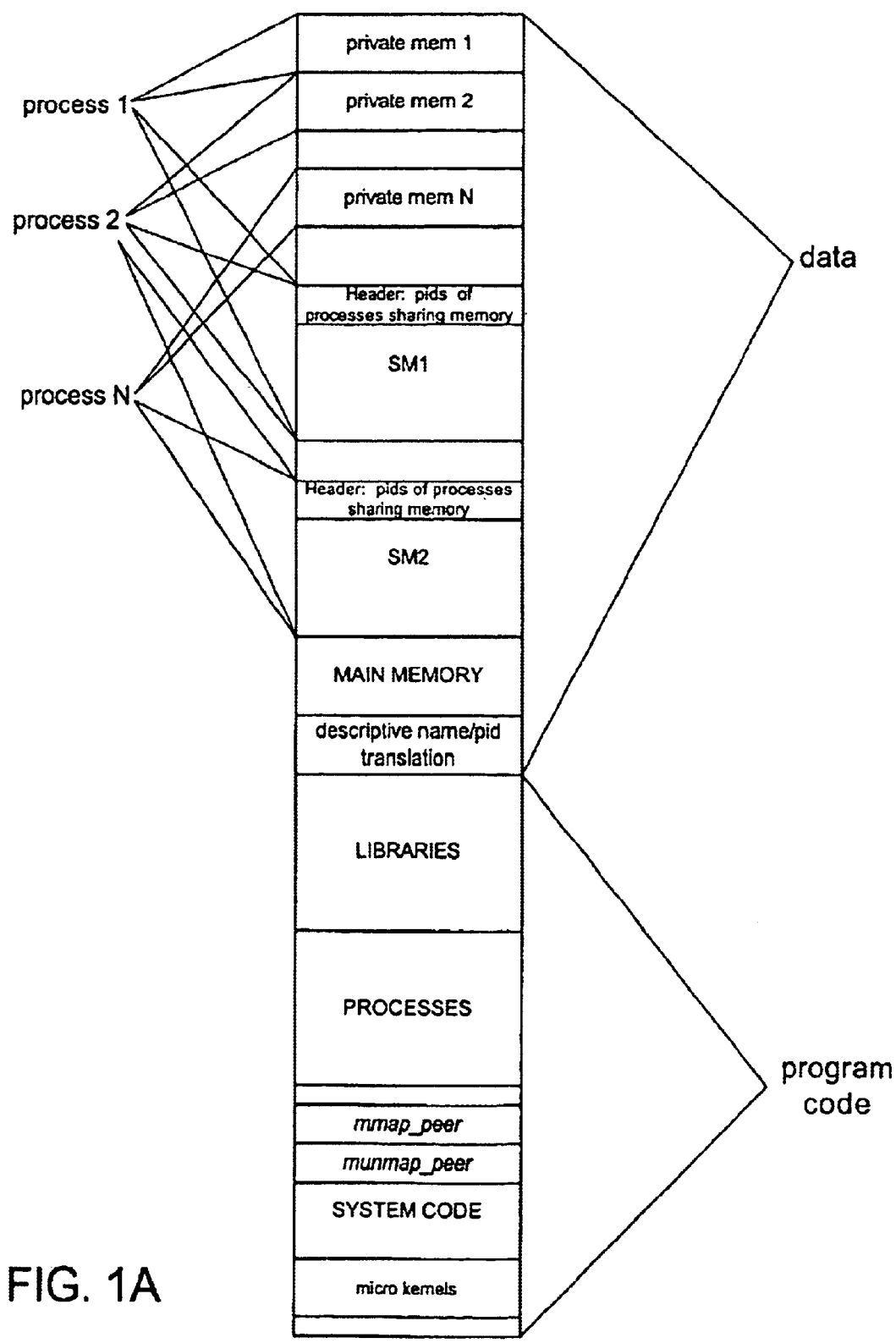
FIG. 1A depicts a memory map of an embodiment of the invention.

The organization of the main memory of the currently described embodiment is depicted in FIG. 1A.

In a POSIX environment the server process uses the system call "mmap( )" to establish a mapping between a range of the addresses in the address space of the process and a portion of some "memory object" (in this case the shared data structure). Before mapping a data structure to memory the process first uses the open( ) system call to obtain a file descriptor for the data structure. The mmap( ) system call takes several parameters including the address in the address space that the file is to be mapped to, a protection argument to specify read, write, and execute permissions, a flag to specify whether the data structure is shared or private, and the file descriptor obtained with the open( ) system call. The mmap( ) system call returns a pointer to the start of the mapped data.

Thus, if the server needs to expand the size of the data structure it must map the additional data and get a new pointer to the start of the added data. As described above this additional mapped will generally not be contiguous with the original mapped data. The new pointer must be communicated to the client processes or they will not be able to access the complete data structure.

Also, if the data structure includes pointers to other areas of memory these areas of memory need to be opened and mapped to the address space of the server. As in the case of non-continuous memory, the new pointer must be communicated to the client processes and each client process must map newly added mapped data to its address space.

The system call "munmap( )" is used to unmap the shared memory.

In the POSIX environment each active process has a unique process ID (pid) which is used by the POSIX kernel to identify the process. The kernel associates all the resources with the process id of the process calling the system call. In case of "mmap" system call, the kernel maps the requested memory into the address space of only the calling process.

Also, in the POSIX environment, when an application uses a system call, library code running with the application packs all the parameters passed to the system call into a data structure. The library then invokes the kernel system call handler using processor specific mechanisms, passing the data structure as the parameter.

POSIX defines the calls to map shared memory as: void*mmap(void*addr, size_t len, int prot, int flags, int fildes, off_t off); int munmap(void addr, size_t len). The description of these calls can be found in any POSIX reference, for example IEEE POSIX standard 1003.1-1990.

Figure 2:
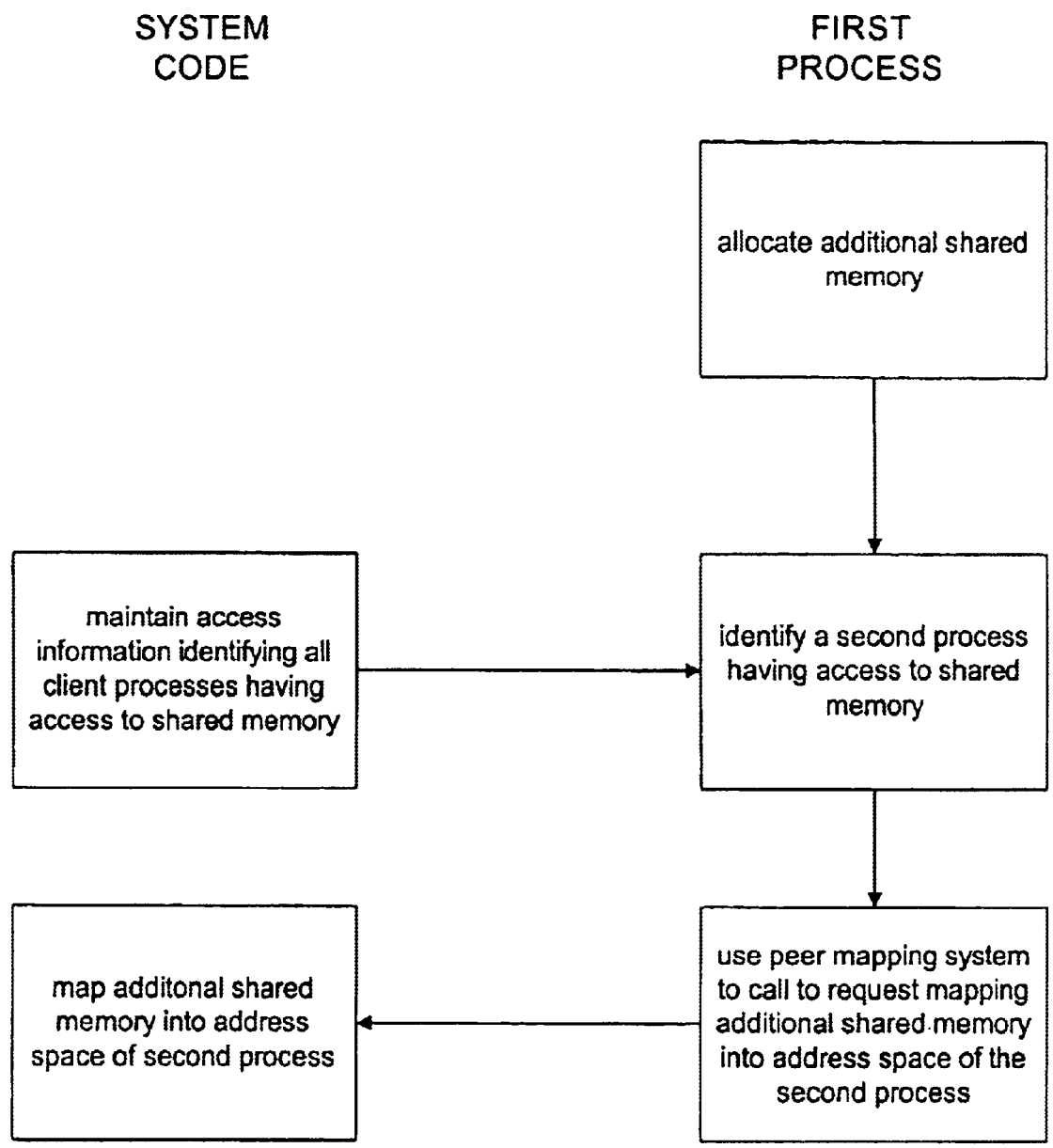
FIG. 2 is a flow chart depicting a method used in a preferred embodiment of the invention.

In one embodiment of the invention two new system calls are implemented. These systems calls are called: void*mmap_peer(pid_t pid, void*addr, size_t len, int prot, int flags, int fildes, off_t off); int munmap_peer(pid_t pid, void addr, size_t len). These two system calls take one additional parameter compared to their standard POSIX counterpart. The additional parameter, pid, defines the process identification of the process for which the shared memory is requested. As described more fully below, the pid parameter used in mmap_peer can identify any process attached to the shared memory. Thus, the calling process can map additional shared memory into the address space of client processes directly without requiring the notification process of the prior art. The operation of these new system calls will now be described with reference to the flow chart of FIG. 2.

In POSIX, the kernel assigns an identification number, the process ID (PID), to every process when it is started. This identification number uniquely identifies the process to the kernel or another application. Typically applications cannot infer anything from this number about the properties of the process.

It is possible to use another form of process identification in the mmap_peer system call. Using any other identification will require a translation layer to map the user provided identification number into kernel known process identification. For example, a process could be identified more descriptively as "spreadsheet" and the translation layer would map the text string "spreadsheet" to the PID.

The initial opening of shared memory by the server and attachment by various client processes can be accomplished using the standard techniques described above. Alternatively, the server can use mmap_peer to map the shared memory into its own address space as well as the address space of each client.

In the currently described embodiment, each process that is sharing the shared memory maps the header of the shared memory into its address space and adds its PID into the header of the shared memory. Thus, the PIDs of all applications attached to the shared memory are available to any process that is altering the shared memory.

Subsequently, when additional shared memory is allocated to increase the size of the shared data structure, the server process uses mmap_peer( ) interface to map the shared memory to each client. This way the server is not required to send special messages to the clients whenever the size of the shared data structure increases. The server calls this interface for each client which is connected to it, giving that clients Process Identifier as an argument. Additionally, the server can provide its own PID as an argument to mmap_peer( ) to map the memory into its own address space.

Alternatively, as described above, the server process can use an alias, such as descriptive name, for the client process.

Thus, with the new interface, the need for exchanging messages giving the information about change in data structure size is eliminated. Clients processes will see the changes in size of the data structure automatically.

The system calls for mapping and unmapping the changes to shared memory in all the client processes may be implemented in various ways.

In one embodiment, the system call code that expands and shrinks the size of shared memory is in a library that is linked with all the processes that use shared memory. In this embodiment, the system call is implemented in the library as a message to the micro kernel. As described above, a part of shared memory, e.g., part of the shared memory header, is reserved for use by the system call library code to keep track of processes that are using the shared memory. When the server uses the mmap_peer( ) system call, this code maps the additional shared memory allocated by the server into the memory space of process indicated by the pid used as the argument in the system call.

Alternatively, a server can register all the processes associated with a shared memory and include system call code to then provide services to expand and/or shrink the size of shared memory and update the mapping function in each client process.

In one embodiment, the system call code maintains records for each client tracking locations of the shared memory mapped into the client's address space. If a client process starts or restarts subsequent to a previous addition of shared memory then the system call code updates the mapping of the shared memory into the address space of the started or restarted client process and returns to it pointer to the beginning of the data structure in the shared memory.

The invention may be implemented as program code, stored on a computer readable medium, that is executed by a digital computer. The computer readable medium may include, among other things, magnetic media, optical media, electro-magnetic fields encoding digital information, and so on.

Figure 3:
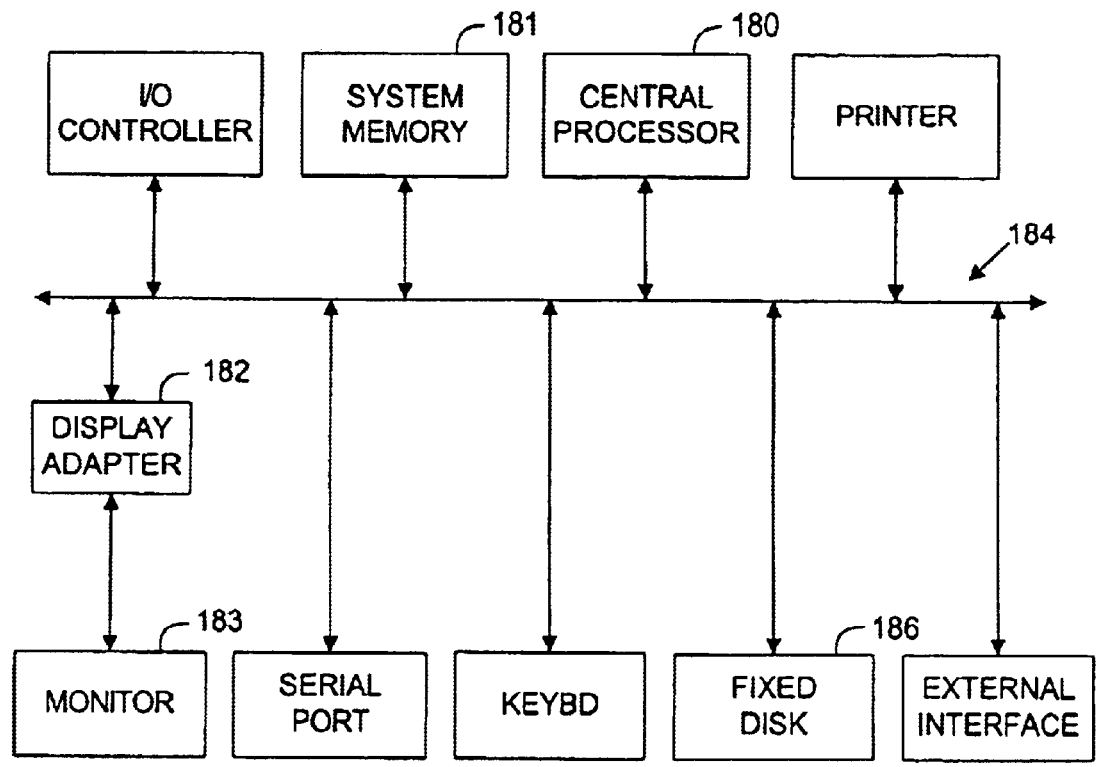
FIG. 3 is a block diagram of a computer system suitable for use with embodiments of the invention.

FIG. 3 depicts a computer system suitable for use with embodiments of the present invention. In FIG. 3, the subsystems are represented by blocks such as central processor 180, system memory 181, display adapter 182, and monitor 183. The subsystems are interconnected via a system bus 184. Additional subsystems such as a printer, keyboard, fixed disk 156, or other computer readable storage media, are shown. The interconnection via system bus 184 allows central processor 180 to communicate with each subsystem and to control the execution of instructions from system memory 181 or computer readable storage 186 medium and exchange information between subsystems. Other arrangements of subsystems and interconnections are possible.

The invention has now been described with reference to the preferred embodiments. Alternatives and substitutions will now be apparent to persons of skill in the art. For example, it can be utilized in a non-POSIX system that allows file mapping and memory sharing. Additionally, other methods of providing client PIDs to the server are known in the art and can be employed in the invention. Accordingly, it is not intended to limit the invention except as provided by the appended claims.

What is claimed is:

1. In a computer system executing a plurality of processes, with each process having its own memory space and having access to a shared memory, an improved method for allocating shared memory including the acts of:
   maintaining access information identifying all client processes having access to shared memory;
   at a first process that has allocated additional shared memory:
      obtaining access information identifying a second process having access to shared memory;
      using a peer mapping system call to request mapping the additional shared memory into the address spaces of the second process having access to the shared memory;
   in response to the peer mapping system call, mapping the additional shared memory into the address space of the second process having access to the shared memory so that second process has the entire active shared memory mapped into its address space.

2. The method of claim 1 wherein said act maintaining access information includes the acts of:
   maintaining a data structure containing process IDs of each process having access to the shared memory.

3. The method of claim 1 wherein said act maintaining access information includes the acts of:
   maintaining a data structure containing descriptive names of each process having access to the shared memory;
   maintaining a data structure containing process IDs of each process having access to the shared memory; and
   mapping the descriptive name of each process to a process ID for the process.

4. A computer program product for use on a system including a digital computer that implements shared memory shared between at least a first and second process, the computer program product comprising:
   a computer usable medium having computer readable program code physically embodied therein, said computer program product further comprising:
   computer readable program code for causing said digital computer to maintain access information identifying all client processes having access to shared memory;
   computer readable program code for causing said digital computer to map the access information into private address space of the first process:
   computer readable program code, responsive to a peer mapping system call from said first process, for causing said digital computer to utilize the access information to map the additional shared memory into the address space of the second process having access to the shared memory so that second process has the entire active shared memory mapped to its address space.

5. The computer program product of claim 4 further comprising:
   computer readable program code for causing said digital computer to maintain information specifying the location of shared memory mapped to each process.

6. The computer program product of claim 4 further comprising:
   computer readable program code for causing said digital computer to maintain a data structure containing process IDs of each process having access to the shared memory.

7. The computer program product of claim 4 further comprising:

computer readable program code for causing said digital computer to:

maintain a data structure containing descriptive names of each process having access to the shared memory;

maintain a data structure containing process IDs of each process having access to the shared memory; and map the descriptive name of each process to a process ID for the process.

8. The computer program product of claim 4 further comprising:

computer readable program code for causing said digital computer to update the mapping of the shared memory into the address space of a started or restarted client process and return to it a pointer to the beginning of a data structure in the shared memory.

9. The computer program product of claim 4 further comprising:

computer readable program code for causing said digital computer, for each process that is sharing the shared memory, to map a header of the shared memory into its address space and to add process identification information for the process into a header of the shared memory.

10. The computer program product of claim 4 further comprising:

computer readable program code for causing said digital computer to implement system call code that expands and shrinks the size of shared memory in a library that is linked with all the processes that use shared memory;

computer readable program code for causing said digital computer to implement the peer mapping system call in the library as a message to a micro kernel.

* * * * *